(12) United States Patent
Tarumi

(10) Patent No.: US 7,317,589 B2
(45) Date of Patent: Jan. 8, 2008

(54) MAGNETIC RECORDER

(75) Inventor: Ryohei Tarumi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/488,604

(22) Filed: Jul. 19, 2006

(65) Prior Publication Data

US 2007/0025009 A1    Feb. 1, 2007

(30) Foreign Application Priority Data

Jul. 29, 2005    (JP) ............................. 2005-221520

(51) Int. Cl.
*G11B 15/18* (2006.01)
*G11B 21/02* (2006.01)
(52) U.S. Cl. .......................................... 360/69; 360/75
(58) Field of Classification Search ...................... None
See application file for complete search history.

(56) References Cited

U.S. PATENT DOCUMENTS 3,835,297 A * 9/1974 Inoue et al. ................ 235/469

* cited by examiner

*Primary Examiner*—K. Wong
(74) *Attorney, Agent, or Firm*—Sughrue Mion, PLLC

(57) ABSTRACT

A magnetic recorder for performing at least one of magnetic recording and magnetic reproduction on a running magnetic tape, comprising: a magnetic head mounted so as to slidably abut on the magnetic tape; a subject portion made of the same material as that of the magnetic head and provided so as to slidably abut on the magnetic tape; a tinge detection sensor for detecting a color of a surface of the subject portion slidably abutting on the magnetic tape; and a judgment portion for acquiring a detection signal output from the tinge detection sensor when the color of the surface of the subject portion detected by the tinge detection sensor changes to a specific color.

13 Claims, 3 Drawing Sheets

MAGNETIC RECORDER

FIELD OF THE INVENTION

The present invention relates to a magnetic recorder. Particularly, it relates to a magnetic recorder for detecting the timing of starting cleaning of a magnetic head.

BACKGROUND OF THE INVENTION

Among magnetic recorders (hereinafter also referred to as "recorders" simply) such as a video tape recorder (VTR), a rotating digital audio tape (R-DAT) recorder, etc. for performing magnetic recording and magnetic reproduction, there was heretofore a magnetic recorder provided with a magnetic head for writing information onto a running magnetic tape and reading information from the magnetic tape.

SUMMARY OF THE INVENTION

In the aforementioned magnetic recorder, it was necessary to clean the magnetic head properly because the magnetic head was stained in accordance with a period of time for which the magnetic head was running. As for the timing of cleaning, it was general that cleaning of the magnetic head was requested from the magnetic recorder side uniformly whenever the magnetic head was used for a time not shorter than a certain running time. The degree of progress in staining the magnetic head, however, varied according to contact pressure between the magnetic head and the magnetic tape and other operating conditions of magnetic recording/reproduction. In the case where cleaning of the magnetic head was requested from the magnetic recorder side at intervals of a predetermined time, it would be conceived that the progress in staining the magnetic head before the magnetic tape was made to run for a period of a predetermined running time might constitute an obstacle to recording/reproduction. When the interval of cleaning the magnetic head was set at a predetermined value as described above, there was a possibility that the magnetic head could not be cleaned at a proper timing. In this respect, there was still room for improvement.

The invention is developed under such circumstances. An object of the invention is to provide a magnetic recorder and a cleaning setting method in which the timing to clean a magnetic head can be detected.

The object of the invention is achieved by a magnetic recorder for performing magnetic recording/reproduction on a running magnetic tape, including: a magnetic head mounted so as to slidably abut on the magnetic tape; a subject portion made of the same material as that of the magnetic head and provided so as to slidably abut on the magnetic tape; a tinge detection sensor for detecting a color of the surface of the subject portion slidably abutting on the magnetic tape; and a judgment portion for acquiring a detection signal output from the tinge detection sensor when the color of the surface of the subject portion detected by the tinge detection sensor changes to a specific color.

In addition, the object of the invention is achieved by a cleaning setting method for detecting the timing to clean a magnetic head of a magnetic recorder, the magnetic recorder including the magnetic head for performing magnetic recording/reproduction on a running magnetic tape, the cleaning setting method including the steps of: providing a subject portion made of the same material as that of the magnetic head so that the subject portion slidably abuts on the magnetic tape; making a tinge detection sensor detect a color of the surface of the subject portion slidably abutting on the magnetic tape; and setting start of cleaning of the magnetic head when the color of the surface of the subject portion detected by the tinge detection sensor changes to a specific color.

The invention is configured so that the subject portion made of the same material as that of the magnetic head is a subject of detection by the tinge detection sensor. While the magnetic tape is running, staining the subject portion progresses at the same speed as staining the magnetic head. For this reason, stain on the magnetic head can be detected when stain on the subject portion is detected. When the degree of the stain on the subject portion is detected based on the degree of color change in the surface of the subject portion, color change in the surface can be detected by the tinge detection sensor. In this manner, cleaning of the magnetic head can be started soon on the basis of the judgment that staining the magnetic head progresses when the degree of progress in staining the subject portion is detected. For this reason, cleaning can be started in accordance with the degree of progress in actually staining the magnetic head, compared with the case where the timing of cleaning was set in advance based on the running time of the magnetic tape as in the background art.

In the invention, the subject portion is preferably disposed in such a manner that contact force between the subject portion and the magnetic tape is not lower than 10% as high as contact force between the magnetic head and the magnetic tape.

In the invention, the subject portion is preferably made of AlTiC. Further, the tinge detection sensor is preferably a blue sensor.

According to the invention, it is possible to provide a magnetic recorder and a cleaning setting method in which the timing to clean a magnetic head can be detected.

DETAILED DESCRIPTION OF THE INVENTION

An embodiment of the invention will be described below in detail with reference to the drawings.

Figure 1:
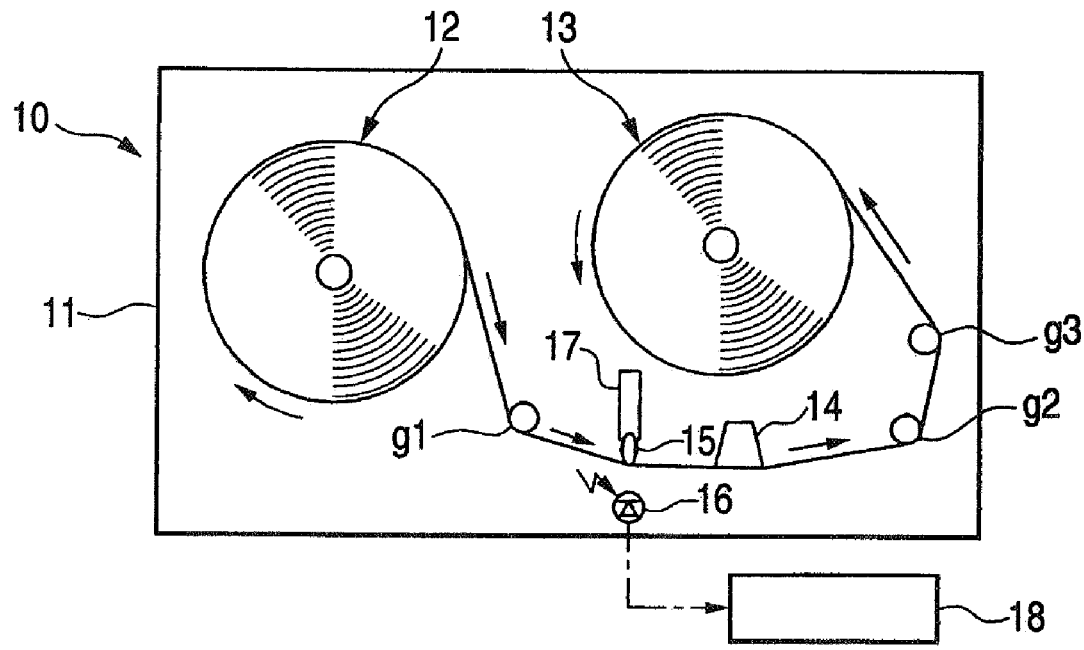
FIG. 1 is a configuration view showing an embodiment of a magnetic recorder according to the invention.
Figure 2:
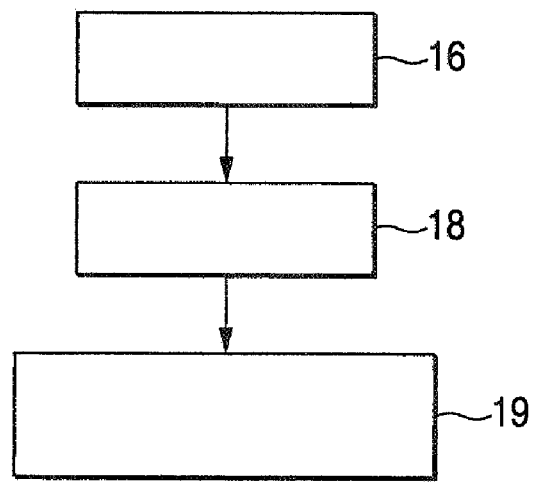
FIG. 2 is a block diagram showing the configuration of the magnetic recorder.

FIG. 1 is a configuration view showing an embodiment of a magnetic recorder according to the invention. FIG. 2 is a block diagram showing the configuration of the magnetic recorder.

The magnetic recorder 10 has a housing 11. A pair of tape reels 12 and 13 are provided in the inside of the housing 11. Opposite end portions of a magnetic tape T used as a recording medium at the time of magnetic recording/reproduction are wound on the pair of tape reels 12 and 13 respectively.

The magnetic recorder 10 is configured so that the magnetic tape T fed out from the feed-side one 12 of the pair of tape reels 12 and 13 is forwarded wile guided by a plurality of tape guides g1, g2 and g3, and that the magnetic tape T forwarded along a predetermined running path is wound on the wind-side tape reel 13.

A magnetic head 14 is provided in the middle of the running path of the magnetic tape T so as to slidably abut on the magnetic tape T. The magnetic head 14 performs an operation of writing magnetic information onto the running tape at the time of magnetic recording, and an operation of reading magnetic information recorded on the magnetic tape at the time of reproduction.

A subject portion 15 is disposed in the running path of the magnetic tape T so as to slidably abut on the running magnetic tape T between the tape reel 12 and the magnetic head 14. In this embodiment, a member at least the surface of which slidably abuts on the magnetic tape T is made of an AlTiC material is used as the subject portion 15.

The subject portion 15 is supported by a support member 17 so that the subject portion 15 can move back and forth with respect to the magnetic tape T. Contact force between the subject portion 15 and the magnetic tape T can be controlled by the back and forth movement of the support member 17. For example, a piezoelectric device or the like which is formed so as to be driven desirably by an electric circuit connected thereto may be used as the support member 17.

Here, the subject portion 15 is preferably disposed so that the contact force between the subject portion 15 and the magnetic tape T is not lower than 110% as large as the contact force between the magnetic head 14 and the magnetic tape T. Specifically, the subject portion 15 is preferably disposed so that the contact force between the magnetic head 14 and the magnetic tape T is in a range of from $0.0007$ $N/mm^2$ to $0.05$ $N/mm^2$ and that the contact force between the subject portion 15 and the magnetic tape T is in a range of from $0.0008$ $N/mm^2$ to $0.055$ $N/mm^2$.

A tinge detection sensor 16 is provided so that the surface of the subject portion 15 slidably abutting on the magnetic tape T is used as a region detected by the tinge detection sensor 16. The tinge detection sensor 16 is configured so that light with a specific wavelength is detected based on the wavelength of light reflected on the surface of the subject portion 15. In this embodiment, a blue sensor for detecting light with a blue wavelength is particularly used as the tinge detection sensor 16. When the surface of the subject portion 15 is made of an AlTiC material as described above, the color changed due to the stain on the surface of the subject portion 15 is substantially blue. Accordingly, the use of the blue sensor as the tinge detection sensor 16 permits detection with high accuracy.

The magnetic recorder 10 further has a judgment portion 18 electrically connected to the tinge detection sensor 16. For example, the judgment portion 18 is a processor provided in the outside or inside of the magnetic recorder 10. A personal computer available on the market may be used as the judgment portion 18. The support member 17 of the subject portion 15 may be electrically connected to the judgment portion 18 so that the support member 17 can be controlled to be driven to move back and forth desirably.

As shown in FIG. 2, in the magnetic recorder 10 according to the embodiment, a detection signal output from the tinge detection sensor 16 is sent to the judgment portion 18 when color change in the subject portion 15 is detected by the tinge detection sensor 16 while the magnetic tape T is running. The judgment portion 18 judges the timing for the magnetic recorder 10 to start cleaning on the basis of the detection signal. On this occasion, the judgment portion 18 may be configured so that a control signal is output to a cleaning timing notification unit 19 for performing execution of display of cleaning and generation of notification sound so that the user can recognize the start timing to clean the magnetic head 14.

Figure 3:
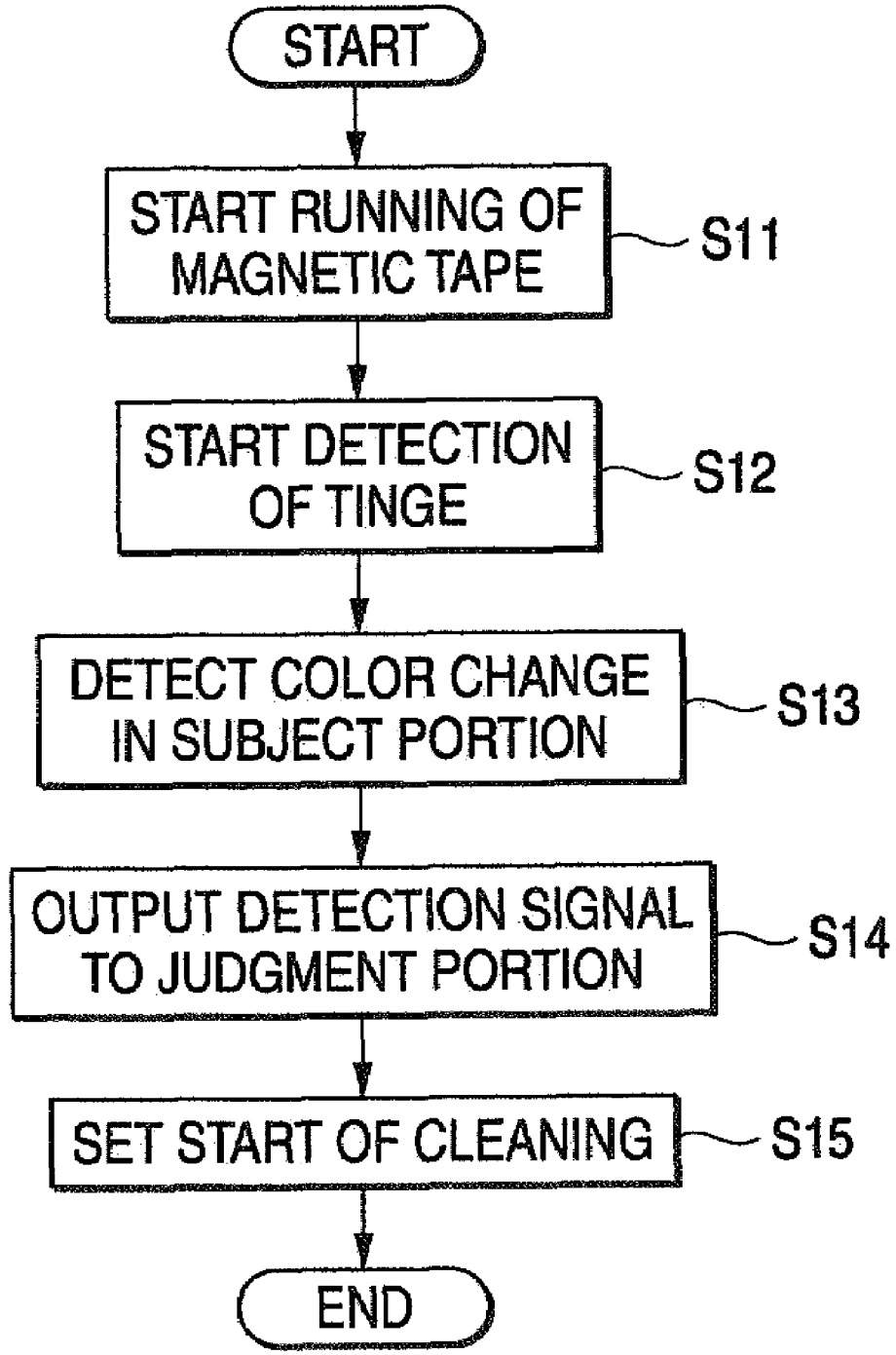
FIG. 3 is a flow chart for explaining a procedure in a cleaning setting method.

FIG. 3 is a flow chart for explaining a procedure in a cleaning setting method according to the invention. The cleaning setting method can be carried out properly by use of the magnetic recorder. Description will be made below with reference to the magnetic recorder configured as shown in FIGS. 1 and 2.

First, the magnetic recorder 10 is activated to start running of the magnetic tape T (step S11). Although this embodiment has been described on the case where ordinary magnetic recording/reproduction and detection on the subject portion are performed simultaneously, the magnetic tape T may be made to run in order to perform only detection on the subject portion before the magnetic recording/reproduction.

In this embodiment, in the condition that the magnetic tape T is made to run, the tinge detection sensor 16 is turned on so that the surface of the subject portion 15 is inspected (step S12).

When the tinge detection sensor 16 detects color change in the surface of the subject portion 15 (step S13), a detection signal output from the tinge detection sensor 16 is sent to the judgment portion 18 (step S14). The judgment portion 18 judges the start timing to clean the magnetic head on the basis of the detection signal and executes a predetermined operation. Here, the predetermined operation is an operation by which a control signal for displaying the timing of execution of cleaning the magnetic head 14 as a message visually recognizable to the user on a display portion such as a monitor or a display or a control signal for generating notification sound is output to the magnetic recorder 10 and a device attached to the magnetic recorder 10. When cleaning is provided in advance in the magnetic recorder 10, control may be made so that a cleaning operation can be started automatically in accordance with the detection signal.

According to the invention, configuration is made so that the subject portion 15 made of the same material as that of the magnetic head 14 is a subject of detection by the tinge detection sensor 16. Since staining the subject portion 15 progresses at the same speed as staining the magnetic head 14 while the magnetic tape T is running, the stain on the magnetic head 14 can be detected when the stain on the subject portion 15 is detected. Moreover, the degree of the stain on the subject portion 15 is defined as the degree of color change in the surface of the subject portion 15, so that color change in the surface is detected by the tinge detection sensor 16. When the degree of progress in staining the subject portion 15 is detected in this manner, the progress in staining the magnetic head 14 is judged so that cleaning of the magnetic head 14 can be started immediately. For this reason, cleaning can be started in a proper time in accordance with the degree of progress in actually staining the magnetic head 14, compared with the case where the timing of cleaning was set in advance on the basis of the running time of the magnetic tape T as in the background art.

Incidentally, the invention is not limited to the aforementioned embodiment. Changes, modifications, etc. can be made suitably on the invention.

Figure 4:
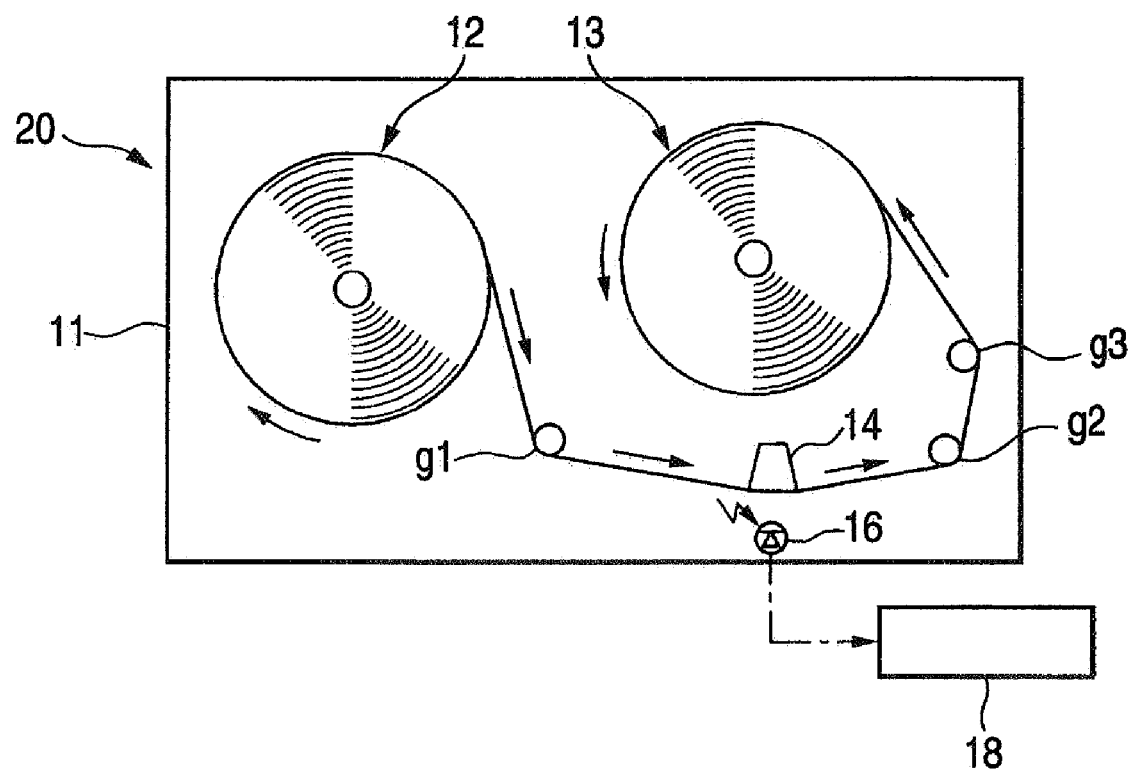
FIG. 4 is a view showing a modified example of the magnetic recorder.

For example, configuration may be made as represented by a magnetic recorder 20 shown in FIG. 4. That is, configuration may be made so that the tinge detection sensor 16 is disposed to cover the surface of the magnetic head 14 as a detectable range, and that color change in the surface of the magnetic head 14 is directly detected to thereby make it possible to detect the timing to clean the magnetic head 14. In this configuration, it is not necessary to provide any subject portion.

This application is based on Japanese Patent application JP 2005-221520, filed Jul. 29, 2005, the entire content of which is hereby incorporated by reference, the same as if set forth at length.

What is claimed is:

1. A magnetic recorder for performing at least one of magnetic recording and magnetic reproduction on a running magnetic tape, comprising:
    a magnetic head mounted so as to slidably abut on the magnetic tape;
    a subject portion made of the same material as that of the magnetic head and provided so as to slidably abut on the magnetic tape;
    a tinge detection sensor for detecting a color of a surface of the subject portion slidably abutting on the magnetic tape; and
    a judgment portion for acquiring a detection signal output from the tinge detection sensor when the color of the surface of the subject portion detected by the tinge detection sensor changes to a specific color.

2. The magnetic recorder as claimed in claim 1, wherein the subject portion is provided in such a manner that a contact force between the subject portion and the magnetic tape is not lower than 110% as high as a contact force between the magnetic head and the magnetic tape.

3. The magnetic recorder as claimed in claim 1, wherein the subject portion is made of AlTiC.

4. The magnetic recorder as claimed in claim 1, wherein the tinge detection sensor is a blue sensor.

5. The magnetic recorder as claimed in claim 1, further comprising a support member supporting the subject portion.

6. The magnetic recorder as claimed in claim 5, wherein the support member is provided to be capable of moving back and forth.

7. The magnetic recorder as claimed in claim 5, wherein the support member is a piezoelectric device.

8. The magnetic recorder as claimed in claim 6, wherein the support member is a piezoelectric device.

9. The magnetic recorder as claimed in claim 5, wherein the support member is electrically connected to the judgment portion so that the support member can be controlled to be driven to move back and forth.

10. The magnetic recorder as claimed in claim 1, wherein the subject portion is provided so that a contact force between the magnetic head and the magnetic tape is in a range of from 0.0007 $N/mm^2$ to 0.05 $N/mm^2$ and that a contact force between the subject portion and the magnetic tape is in a range of from 0.0008 $N/mm^2$ to 0.055 $N/mm^2$.

11. The magnetic recorder as claimed in claim 1, wherein the tinge detection sensor is configured so that light with a specific wavelength is detected.

12. The magnetic recorder as claimed in claim 1, further comprising a cleaning timing notification unit for performing execution of display of cleaning or generation of notification sound, wherein the judgment portion is configured so that a control signal is output to the cleaning timing notification unit.

13. The magnetic recorder as claimed in claim 1, wherein the tinge detection sensor is provided to cover a surface of the magnetic head as a detectable range, so that color change in the surface of the magnetic head is directly detected by the tinge detection sensor.

* * * * *